(12) United States Patent
Shefet et al.

(10) Patent No.: US 7,048,622 B2
(45) Date of Patent: May 23, 2006

(54) AUTOMATED LATERALLY OFFSET RETRACTABLE FOOD DISLODGEMENT OR GUIDING MECHANISMS AND ASSOCIATED METHODS AND SYSTEMS

(75) Inventors: Sarid M. Shefet, Cary, NC (US); Lawrence Alan Chandler, Raleigh, NC (US)

(73) Assignee: ConAgra Foods, Inc., Edina, MN (US)

( * ) Notice: Subject to any disclaimer, the term of this patent is extended or adjusted under 35 U.S.C. 154(b) by 422 days.

(21) Appl. No.: 10/171,864

(22) Filed: Jun. 13, 2002

(65) Prior Publication Data
US 2003/0148724 A1    Aug. 7, 2003

Related U.S. Application Data

(60) Provisional application No. 60/354,097, filed on Feb. 4, 2002.

(51) Int. Cl.
*A22C 11/00* (2006.01)

(52) U.S. Cl. ........................................ 452/32

(58) Field of Classification Search ........... 198/370.03, 198/370.01, 370.09, 370.05
See application file for complete search history.

(56) References Cited

U.S. PATENT DOCUMENTS

| | | | |
|---|---|---|---|
| 2,697,850 A | 12/1954 | Cross | 17/34 |
| 2,873,020 A | 2/1959 | Kay | |
| 3,022,745 A | 2/1962 | Roberts | 104/99 |
| 3,148,783 A * | 9/1964 | Michaels | 198/349.9 |
| 3,533,495 A | 10/1970 | Wallace | |
| 3,808,636 A | 5/1974 | Gouba | 17/1 F |
| 3,964,129 A | 6/1976 | Townsend | |
| 4,060,875 A | 12/1977 | Gosling et al. | |
| 4,079,666 A | 3/1978 | Plemons et al. | |
| 4,112,546 A | 9/1978 | Muller | |
| 4,129,923 A | 12/1978 | Hoegger | 17/33 |
| 4,209,540 A | 6/1980 | Jones, Jr. | 426/414 |
| 4,218,003 A | 8/1980 | Plewa et al. | |
| 4,565,282 A | 1/1986 | Olsson et al. | |
| 4,582,047 A | 4/1986 | Williams | |
| 4,612,684 A | 9/1986 | Kollross | 17/45 |
| 4,644,607 A | 2/1987 | Sziede | 17/45 |
| 4,682,385 A | 7/1987 | Kasai et al. | |
| 4,761,854 A | 8/1988 | Schnell et al. | 17/1 R |
| 4,766,645 A | 8/1988 | Lamartino et al. | |
| 4,771,876 A | 9/1988 | Bandixen | 198/367 |

(Continued)

FOREIGN PATENT DOCUMENTS

FR    2.088.622    4/1970

OTHER PUBLICATIONS

Article, "Continuous Process Systems", Alkar, http://www.alkar.com (date unavailable; believed to be dated before Mar. 1, 2002) pp. 1-3.

(Continued)

*Primary Examiner*—Thomas Price
(74) *Attorney, Agent, or Firm*—Myers Bigel Sibley & Sajovec PA

(57) ABSTRACT

Commercial production transport systems, mechanisms, and guides for food processing are configured so as to automate food handling and/or transport. The systems employ fingers that can be inserted to gap spaces in a carrier surface so as to dislodge, guide and/or route food to travel over predetermined travel lanes. Associated methods can angularly translate food being transported in an automated food processing system in a longitudinally offset direction.

40 Claims, 11 Drawing Sheets

U.S. PATENT DOCUMENTS

| | | | |
|---|---|---|---|
| 4,880,105 A | 11/1989 | Kasai et al. | 198/465.4 |
| 4,899,866 A | 2/1990 | Colamussi | 198/418.1 |
| 4,997,365 A | 3/1991 | Lanham | |
| 5,049,108 A | 9/1991 | Staudenrausch | |
| 5,078,120 A | 1/1992 | Hwang | |
| 5,098,332 A | 3/1992 | Handel | 452/46 |
| 5,102,368 A | 4/1992 | Strasser et al. | 452/51 |
| 5,277,301 A | 1/1994 | Fenty | |
| 5,354,229 A | 10/1994 | Markwardt et al. | 452/51 |
| 5,354,230 A | 10/1994 | McFarlane et al. | 452/51 |
| 5,477,955 A * | 12/1995 | Madden et al. | 198/370.04 |
| 5,480,346 A | 1/1996 | Kasai et al. | |
| RE35,259 E | 6/1996 | Williams | |
| 5,788,563 A | 8/1998 | Nakamura et al. | |
| 5,830,050 A | 11/1998 | Nakamura et al. | 452/31 |
| 5,942,265 A | 8/1999 | Roberds et al. | |
| 5,979,633 A * | 11/1999 | Bonnet | 198/370.09 |
| 5,994,657 A * | 11/1999 | Maier et al. | 209/584 |
| 6,066,035 A | 5/2000 | Hergott et al. | 452/31 |
| 6,071,186 A | 6/2000 | Shibata et al. | |
| 6,213,368 B1 | 4/2001 | Vermeer et al. | |
| 6,277,018 B1 | 8/2001 | Cody et al. | 452/51 |
| 6,290,591 B1 | 9/2001 | Hergott et al. | 452/51 |
| 6,468,143 B1 | 10/2002 | White et al. | 452/32 |
| 6,523,462 B1 | 2/2003 | Johnson et al. | 99/443 C |

OTHER PUBLICATIONS

Article, "Batch Ovens", Alkar, http://www.alkar.com (date unavailable; believed to be dated before Mar. 1, 2002) pp. 1-3.

Brochure, "Fessmann Turbomat 7000: Industrial Smoking and Cooking", Fessman Group (date unavailable; believed to be dated before Mar. 1, 2002) pp. 1-8.

Brochure, "Fessmann Smoking Cooking Cooling", Fessman Group (date unavailable; believed to be dated before Mar. 1, 2002) pp. 1-8.

Brochure, "Fessmann Transfer 4000: Continuous Smoking, Cooking and Cooling", Fessman Group (date unavailable; believed to be dated before Mar. 1, 2002) pp. 1-9.

Pictures of the inside of a conventional prior art oven from Alkar.

PCT International Search Report, International Application No. PCT/US03/02872 filed Jan. 31, 2003, received Dec. 3, 2003.

* cited by examiner

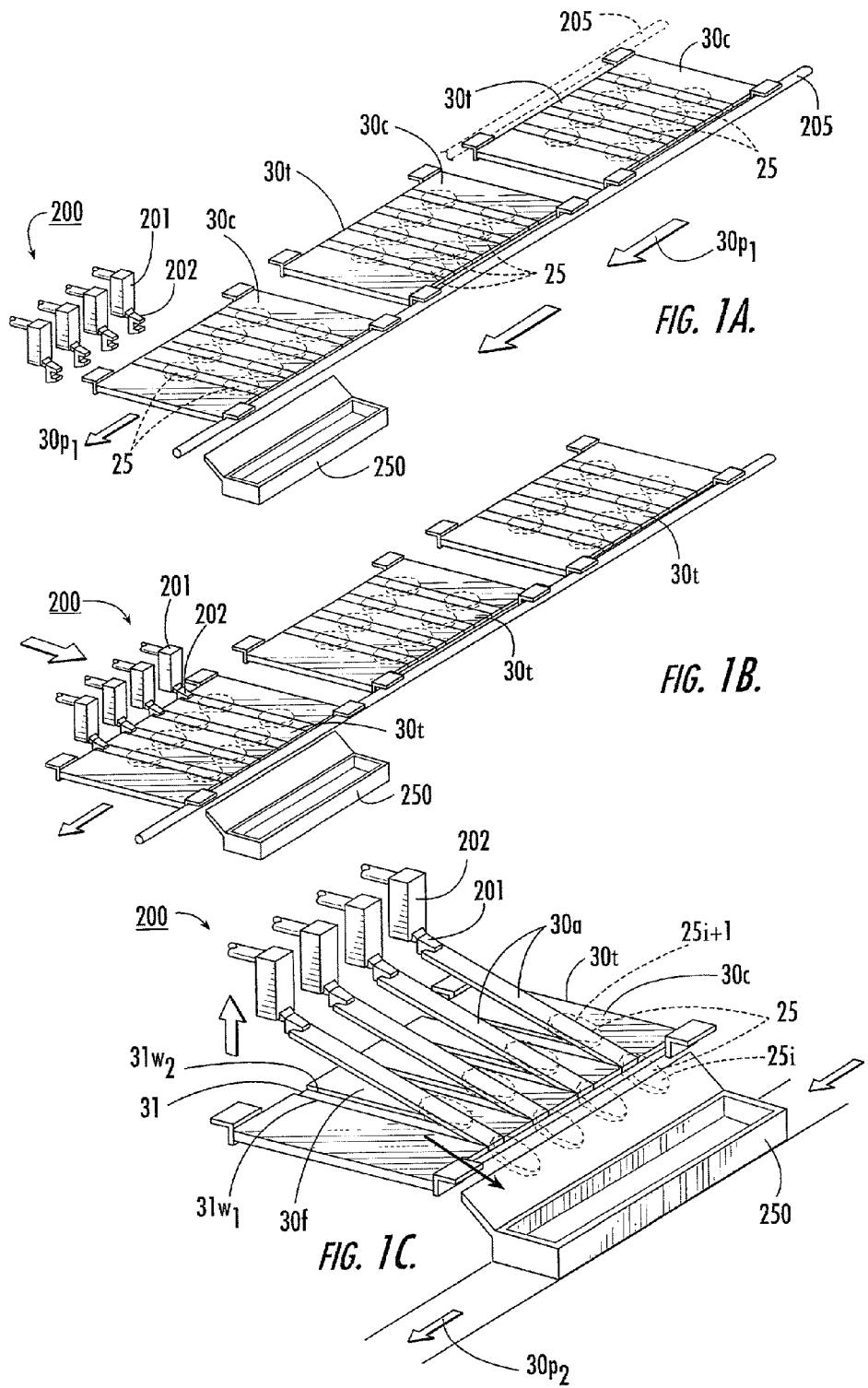

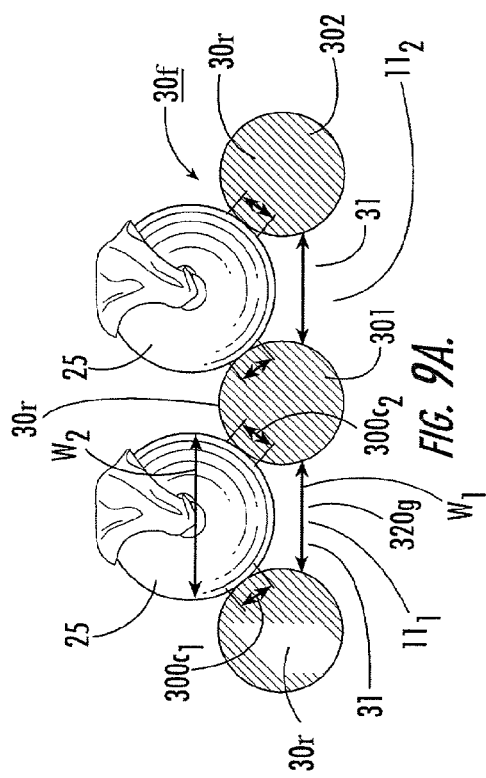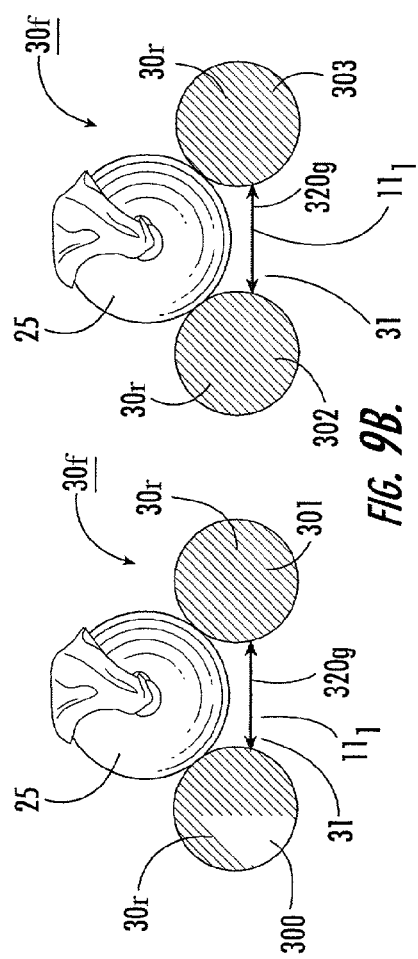

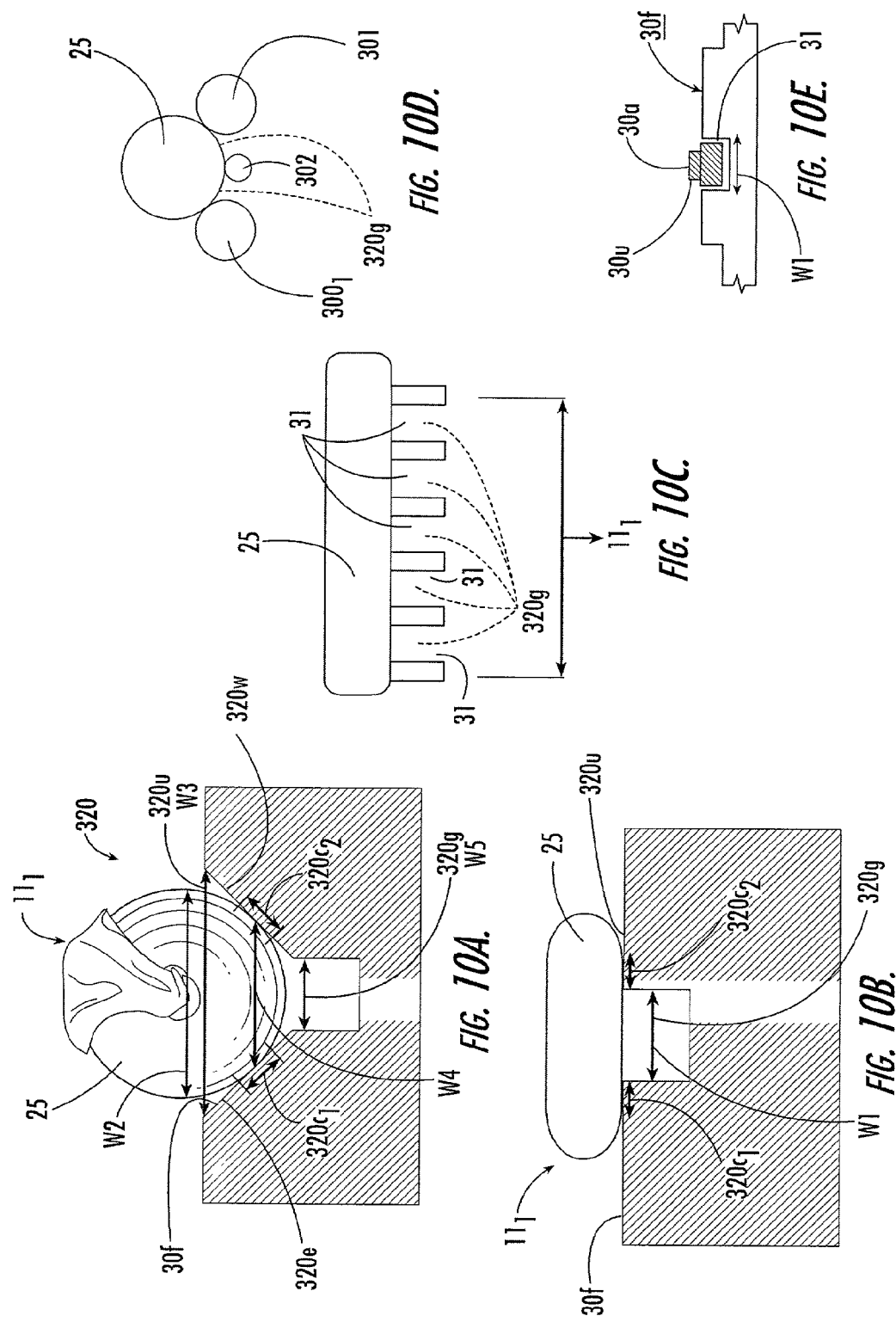

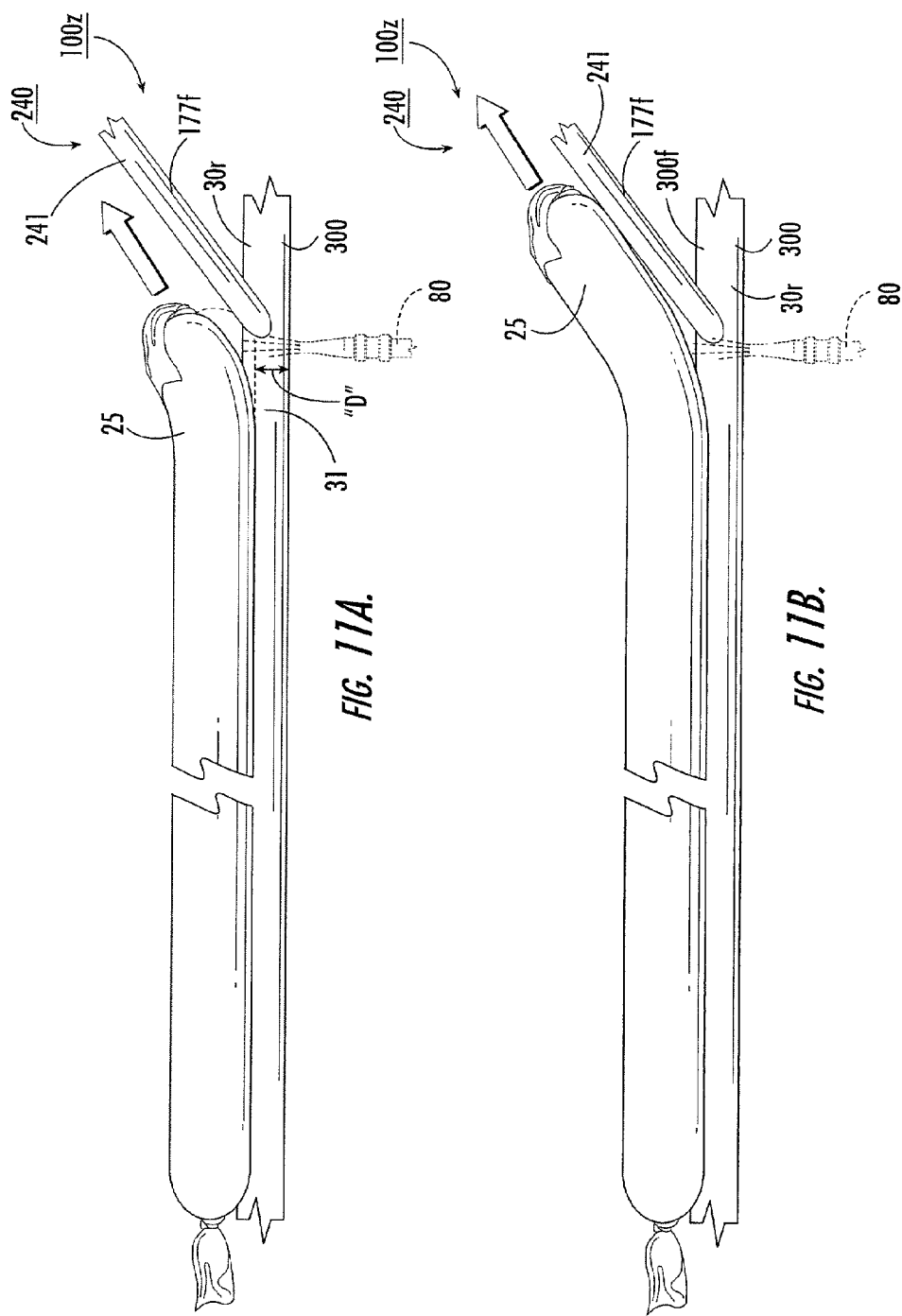

AUTOMATED LATERALLY OFFSET RETRACTABLE FOOD DISLODGEMENT OR GUIDING MECHANISMS AND ASSOCIATED METHODS AND SYSTEMS

RELATED APPLICATIONS

This application claims priority from U.S. Provisional Application Ser. No. 60/354,097, filed Feb. 4, 2002, the contents of which are hereby incorporated by reference as if recited in full herein.

FIELD OF THE INVENTION

The present invention relates to food treatment systems such as vertical rise dryers, smokers, curing chambers, ovens, warmers, coolers, and freezers.

BACKGROUND OF THE INVENTION

Conventionally, several different food treatment system configurations have been proposed to smoke, cure, dry, cook, cool, or freeze food products (such as meat products) with the hope of increasing production capacity while attempting to limit the floor space required for carrying out same. In so doing, vertical rise systems have been used with spiral conveyors to move food vertically through the oven while exposing the food to certain processing conditions as it moves from top to bottom or bottom to top.

For example, the Northfield LST (Large Spiral Technology) freezer available from Frigoscandia Equipment (fmc-foddtech.com) is a high capacity non-self stacking spiral freezer that employs spiral conveyors with belts available in different widths. Ryson International Inc. of Newport News, Va., provides spiral conveyors that allegedly feature a small footprint and space savings over other brands with load capacities of up to 200 fpm.

Another example is the TURBO-Dryer® from Wyssmont (wyssmont.com). The TURBO-Dryer® uses a stack of slowly rotating circular trays. In operation, food is fed onto the top tray and, after one revolution, is wiped or swept onto the next lower tray where the operation is repeated. The trays are enclosed in a vertical enclosure that circulates heated air or gas about the food on the trays. All or selected levels in the enclosure may be held at a uniform temperature or the enclosure may be configured with zoned temperature regions having different temperatures.

Yet another example of vertical rise system is found in U.S. Pat. No. 5,942,265, which describes conveying pepperoni meat to a conventional spiral dryer which includes a number of tiers (typically about 38–42) according to the initial moisture level, the desired final moisture level, the relative humidity of the air, the total amount of water to be removed, the temperature, and the conveyor speed.

Recently, U.S. patent application Ser. No. 09/888,925 to Shefet et al. described an increased capacity food processing system that can limit the amount of dedicated floor space required to support the system in food processing facilities and/or that can increase the amount of food that can be processed through the food processing system over a production period. The contents of this application are hereby incorporated by reference as if recited in full herein.

Despite the above, there remains a need to provide food routing apparatus in food processing systems, particularly in high-speed mass production systems, that can effectuate food transfer along desired travel paths in an automated manner that promotes continuous movement and/or inhibits machine or system downtime.

SUMMARY OF THE INVENTION

The present invention provides food dislodgement or guiding systems, devices, and methods that can move or dislodge food items at a diverter station so that the food items are laterally translated away from the primary downstream direction of travel. The food items are held on a carrier member that includes a primary support surface with at least one recess that is disposed under a portion of the food item(s). The diverter station can employ at least one food diverter that is stationary or retractable/extendable. In certain embodiments, the food diverter can include an arm that can be configured to enter a distance into and/or cooperably engage with the support floor recess(es) to dislodge, lift, push, or pull the food item from a first support surface to a different second support surface and/or carrier member. In other embodiments, the carrier floor includes a plurality of moveable segments, at least one of each residing in the carrier floor recess in advance of the diverter station.

Certain embodiments of the present invention are directed to methods for routing, dislodging or guiding food in a food processing system, including: (a) advancing at least one food item on a carrier surface having a plurality of laterally extending recesses with associated lengths and widths formed therein, the at least one food item positioned so that it overlies a portion of at least one of the plurality of laterally extending recesses; (b) inserting an arm member to engage with the carrier surface so that the arm that enters into at least one of the recesses at a first side portion in the carrier surface under the at least one food item; and (c) moving the arm member so that it travels a distance in the laterally extending recess to dislodge the at least one food item.

In certain embodiments, the food items can be held stationary on a support floor (that can itself be stationary or movable such as a tray or conveyor) and the food diverter arm can be configured to move into the flooring recesses under the support surface to dislodge, scoop, scrape, lift, push, or pull the food item from the support surface onto the diverter. Alternatively, the arm can reside in the recess and the diverter activated to push the arm a distance along the length of the recess.

In other embodiments, the food items can be held on a moving first support surface when the food diverter arm(s) extends to move in the recess and contact the food items and guide or dislodge the food items to a next desired support surface.

In certain embodiments, the food diverter can be configured as a retractable component that periodically extends to engage with a floor or carrier member and then retracts. In other embodiments, the food diverter can be a stationary component that is positioned at a desired location in the travel path of the food item(s).

Other embodiments are directed to methods for routing or guiding food in a food processing system, including: (a) advancing at least one food item on a carrier surface in a first travel direction, the carrier surface having at least one recess with associated length and width formed therein, the at least one food item positioned so that it overlies a portion of the at least one recess; (b) positioning a food diverter having an outwardly extending arm member so that the arm member enters into the recess under the at least one food item; and (c) routing the at least one food item so that it departs from the first travel direction to an angularly offset second travel direction responsive to the positioning step.

The food diverter can be angularly offset from the immediately upstream direction of travel of the food such as, but not limited to, at least about 30 or 45 degrees and typically within about 30–150 degrees. In certain embodiments, the food diverter is angularly offset by about 90 degrees.

Still over embodiments are directed to systems for processing food, including: (a) means for advancing at least one food item on a carrier surface having a plurality of laterally extending recesses with associated lengths and widths formed therein, the at least one food item positioned so that it overlies a portion of at least one of the plurality of laterally extending recesses; (b) means for directing an outwardly extending arm member to engage with the carrier surface so that the arm enters into at least one of the recesses at a first side portion in the carrier surface under the at least one food item; and (c) means for moving the arm member so that it travels a distance along a desired length in the laterally extending recess dislodges the at least one food item off of the carrier surface.

Other embodiments are directed to systems for routing or guiding food in a food processing system, comprising: (a) means for advancing at least one food item on a carrier surface in a first travel direction, the carrier surface having at least one recess with associated length and width formed therein, the at least one food item positioned so that it overlies a portion of the at least one recess; (b) means for positioning a food diverter having a forwardly extending finger so that it engages with the carrier surface and allows the arm member to enter into the recess under the at least one food item; and (c) means for routing the at least one food item so that it departs from the first travel direction to an angularly offset second travel direction.

The food diverter can include either a stationary or moving floor, or combinations thereof, that cooperates with stationary or moving floors (such as one or more conveyors) located on one or either side thereof. In certain embodiments, the food diverter is stationary and resides in the line of travel of the food and is positioned between two moving floors to transfer food being advanced therebetween so as to provide the desired speed and inhibit collisions or disruptions in the transport process. In other embodiments, the router guide is dynamically configured to repetitively extend and retract into the travel path (positionally offset relative thereto).

In certain embodiments, the carrier surface is provided by a moving floor proximate the router guide that is configured with a support surface that has a gap portion that underlies a food product. The a forwardmost finger be configured to be forwardly located and downwardly extending so that, in operation, it is received into the gap of the moving or stationary floor underlying the food to thereby direct, scoop, or lift the food onto or over the and through the rearward portion of the router guide so as to automatically cause or direct the food to travel a desired travel path associated therewith. The finger can be configured to direct the food upward or downward to a subsequent carrier surface or travel path so as to advance the food in the processing system environment.

In other embodiments, the arm member and/or finger can be configured to retract and extend to repetitively enter the gap portion(s) of the floor so as to engage with a stationary or moving floor, and, in operation, dislodge food items resting on the surface of the floor proximate the underlying finger of the router guide.

The food processing system can be configured to provide separate temperature regulated (and moisture or humidity, air velocity, cooling, heating, sprinkling, gas, and the like) spaces over one or more tiers in the vertically stacked ovens (or over other spaces in non-stacked ovens).

As before, in operation, in certain particular embodiments, the food item can be propelled forward to travel upwardly over the finger of the food diverter (that may have a dynamic and/or stationary floor portion) that can be positioned intermediate a first moving floor portion and a second moving floor portion.

The foregoing and other objects and aspects of the present invention are explained in detail in the specification set forth below.

BRIEF DESCRIPTION OF THE DRAWINGS

FIG. 1A is a perspective view of a portion of a travel path with a plurality of carrier members and a diverter station according to certain embodiments of the present invention.

FIG. 1B illustrates the travel path shown in FIG. 1A with the diverters of the diverter station engaging with a carrier member according to embodiments of the present invention.

FIG. 1C illustrates the carrier member shown in FIG. 1B, with the diverters raised to an elevated position, thereby directing the food items to be dislodged from the carrier member into a receiving station or member according to embodiments of the present invention.

FIG. 9A is a front section view of a portion of a floor according to embodiments of the present invention.

FIG. 9B is a front section view of a portion of a floor according to embodiments of the present invention.

FIGS. 10A–10E are front section views of a portion of a floor according to embodiments of the present invention.

FIG. 11A is a partial side view of a portion of a food travel path with the food being guided forward as it approaches a finger positioned lower than the upper surface of the floor in a food guide transition zone.

FIG. 11B is a partial side view of the food travel path of FIG. 1A with the food progressing forward up the finger of a router guide according to embodiments of the present invention.

DESCRIPTION OF EMBODIMENTS OF THE INVENTION

Figure 2A:
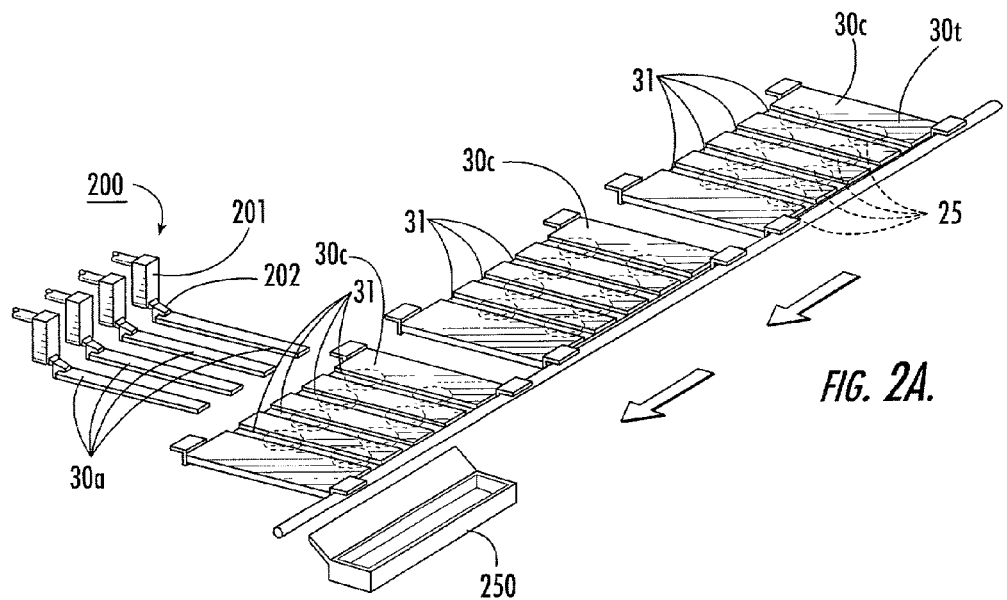
FIG. 2A is a perspective view of a portion of a travel path with a plurality of carrier members and a diverter station with a plurality of diverter members according to additional embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity and broken lines illustrate optional features or operations unless stated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The present invention is directed to food preparation and/or processor systems. The systems can be used in commercial low volume and/or large-scale mass production of food items. The food processor system can be a horizontal or vertical rise system and can include different zones exposed to different processing conditions, such as one or more of a dryer, a heater, an oven, a curing or smoking source, a cooler or refrigerator or freezer and the like. The food processor system can be configured to process solid or semi-solid food items or liquid items in containers or casings or shells. Examples of food items include, but are not limited to, baked goods, candies, bakery and dairy products, and meat products. In certain embodiments, the food processing system and/or related devices may be particularly suitable to process discrete low profile items (substantially planar or flat objects or meat products), as well as elongated food items such as, but not limited to, elastic or partially elastic food items such as cheese (like mozzarella strands), dough (for incubation), meat sticks or strands, and the like.

Of course, the processing system can be configured to convey or move other items through a processing facility where enhanced capacity is desired. For example, the processing system may be adapted for medical products, pharmaceuticals where sterilization is desired or for implements, surgical tools or other items desiring sterilization, or manufacturing facilities for products undergoing curing, coating, brazing, tempering, sintering, or other processing condition. Still additional examples of other elongated products that may be routed, guided, or handled by the devices, methods, and systems of the instant invention include candles, ropes, cables, wires, and the like. See U.S. Pat. No. 4,582,047 and RE35,259, U.S. Pat. No. 5,942,265, U.S. Pat. No. 5,078,120, and U.S. Pat. No. 4,079,666 for discussions of exemplary processing conditions for food and conveyor means, the contents of which are hereby incorporated by reference as if recited in full herein.

In certain embodiments, the present invention is used to move a length of an elongated product held in a casing. The casing can be any suitable casing (edible or inedible) such as a collagen casing. The elongated product can be an elongated meat product. Exemplary products include, but are not limited to, strands of meat such as pepperoni or beef, a processed meat product such as a pepperoni or beef stick, sausage, hotdog, or the like.

The elongated meat product can be configured as a continuous length of product. The length may be selected so as to cover one or a plurality of lanes, tracks or perimeter paths over at least one tier or level. In certain embodiments, the length of product is continuous so as to be able to extend over at least one revolution in a lane in a desired travel path. In certain embodiments, the elongated meat product has a length of at least about 20–25 feet, and preferably at least about 50 feet. In particular embodiments, the elongated meat product can have a length of between about 50–85 feet or more.

In some embodiments, the elongated food item may be elastic (at least in tension) so as to allow stretching without unduly altering or deforming its desired shape during processing. The elongated food item may be held in a natural or synthetic casing.

In operation, the product may have an exterior surface that exhibits increased friction relative to a finished, cured, or dried configuration. For example, a collagen casing can be described as having a relatively gelatinous sticky residue prior to its finished state that can cause the food to attempt to stick to a floor or support surface during transport and may make it difficult to route or guide this type of product in an automated relatively fast speed transport arrangement, particularly where non-linear or selectably changeable travel paths are desired. Alternatively, as the food item is prepared or processed, it may adhere to the underlying carrier member or support surface, making it difficult to easily remove the items after cooking or other preparation procedure.

Turning now to FIG. 1A, one embodiment of a system with a food diverter station 200 and food path with an associated advancing transport system is shown. In this embodiment, the advancing transport system employs a plurality of discrete carrier members 30c. In the embodiment shown, the carrier members 30c are trays 30t that can be oriented with the primary surfaces being disposed substantially horizontally and serially aligned to advance along a predetermined transport path defined by opposing support rails or tracks 205. As shown in FIGS. 1B and 1C, the food product 25 can be positioned on the carrier member 30c and advanced to the food diverter station 200 whereupon the food diverter station 200 engages the carrier member 30c to dislodge or guide the food product 25 into a laterally offset holding bin or receptacle 250 or other suitable food support component. The rails or tracks 205 can be motorized tracks that are automatically driven, such as via a belt or chain drive or other drive mechanism, so as to advance each carrier member 30c to serially present them at the food diverter station 200. In other embodiments, the trays 30t can be advanced by manually or automatically pushing the trays from behind upon contact with the adjacent rearwardly (downstream) disposed tray 30t.

In operation, each tray 30t or portion of the carrier member 30c can be advanced to the diverter station 200 where it can dwell as the diverter member 201 engages the arm members 30a and moves them laterally along a portion of the length of the recess and/or upward as shown. The food diverter station 200 diverts the food product 25 from a first travel path $30p_1$ (illustrated by the broken line with arrow shown in FIG. 1A adjacent element $30p_1$) to a second travel path $30p_2$ (illustrated by the broken line arrow adjacent the element number $30p_2$ in FIG. 1C) that is laterally spaced apart a distance from the first travel path. "Laterally spaced apart" means that the food 25 is moved sideways. In certain embodiments, such as shown in FIGS. 1A–1C, the food product 25 is moved in a direction that is transverse or substantially perpendicular to the downstream direction of travel, either in an inward or outward direction (moving either to the right or left away from the primary direction of travel).

It is noted that, although shown in the figures as carried out in a horizontal orientation, the food diverter 200 can be configured to engage vertically oriented trays 30t or carrier members 30c, to push food substantially vertically downwardly, typically starting from a top portion of the tray 30t and/or to push food substantially vertically upwardly from a position that is adjacent a bottom portion of the tray 30t (not shown). In still other embodiments, the tray 30t may be held in an inclined or descending orientation (not shown).

As shown in FIG. 1C, the carrier members 30c are formed with a plurality of recesses or channels 31 that are sized and configured to receive at least one arm member 30a therein. The arm members 30a can be sized to substantially fill the recesses 31 and act as planks to form a portion of the food support surface on the carrier member 30c so as to be substantially flush with the adjacent food support surface. In other embodiments, the arm members 30a can be configured to occupy a subset of the volume or area defined by the recesses 31 so as to reside under the level of the food support surface 30f of the remaining portion of the food support floor provided by the carrier member 30c. For the sub-surface embodiment, the arm member 30a will not typically contact the overlying food products until the food diverter station 200 causes the arm members 30a to rise thereby inhibiting the food product from adhering to it during processing. Thus, when the arm members 30a are raised above the floor surface 30f as shown in FIG. 1C, the food product 25 may be more easily dislodged from the carrier member 30c. Further, the food product 25 may gravimetrically slide down the inclined arm 30a. In any event, in certain embodiments, the arm member 30a may be lubricated and/or vibrated during the inclining or inserting operation to facilitate the dislodgement and/or removal of the food product 25 from the arm member 30a and/or tray 30t.

The food products 25 may be substantially symmetrically arranged and/or substantially centered over the recesses 31 as shown in FIGS. 1A–1B. In other embodiments, no such deliberate or symmetrical arrangement is required and the food product 25 can be asymmetrically distributed over as the floor of the carrier member 30f.

In the embodiment shown in FIG. 1C, the recess 31 includes two upstanding stationary wall portions $31w_1$, $31w_2$ positioned on opposing sides of the recess 31. The recess 31 may be enclosed with an underlying sub-floor, or may be open or partially open (e.g., grated or the like). The arm member 30a may be configured to be substantially free floating within the corresponding recess 31, attached to the carrier member 30c via securing means such as matable female and male components (grooves and channels), frictional engagement, pivot joints or hinges disposed on one side edge portion of the member 30c (away from the side with the diverter station 200 to allow the arm member 30a to flip up or down as desired), or otherwise moveable within the recess 31.

Figure 2B:
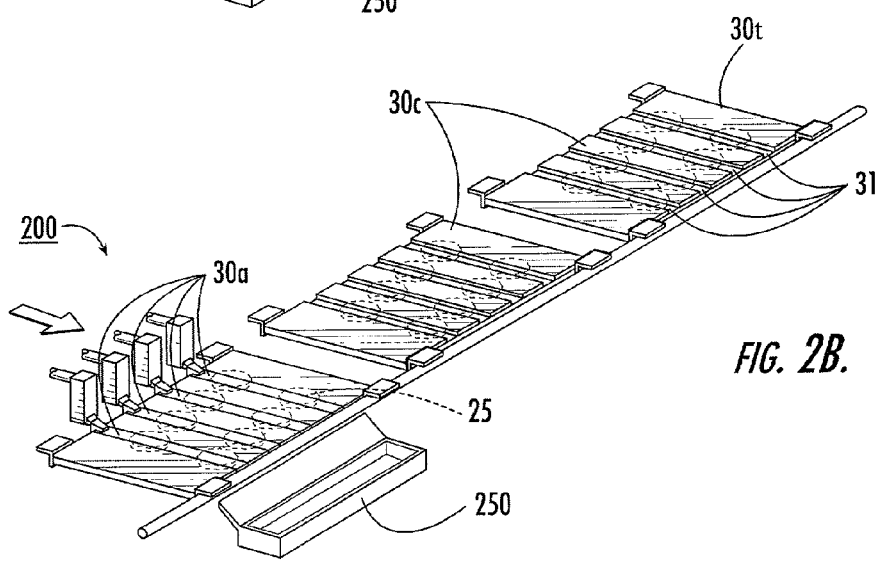
FIG. 2B illustrates the diverter members of FIG. 2A engaging a carrier member at the diverter station according to embodiments of the present invention.
Figure 3:
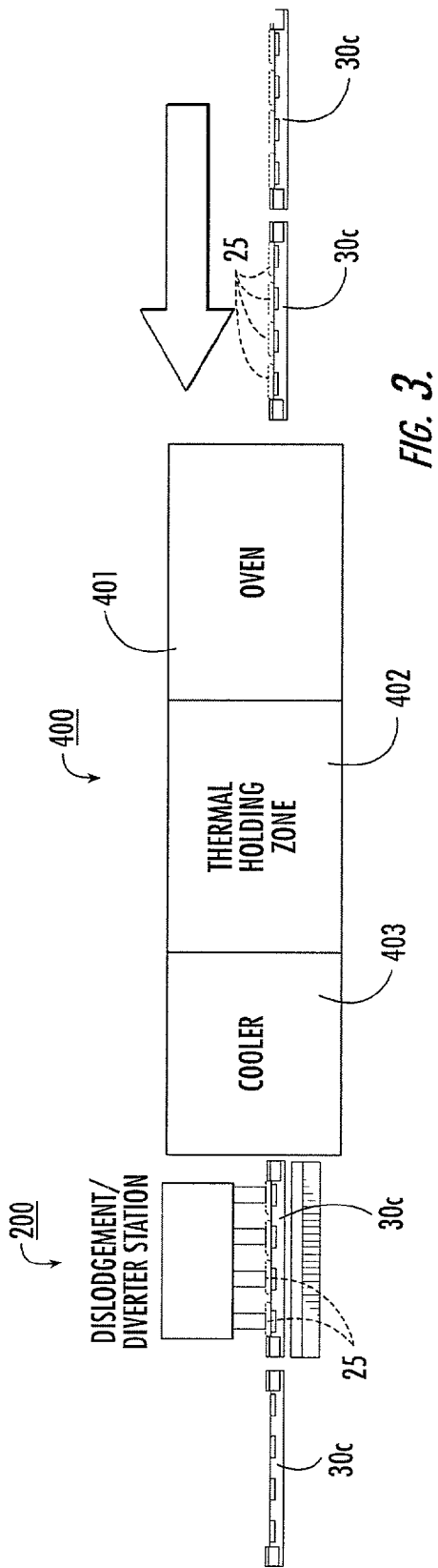
FIG. 3 is a schematic side view of a thermal processing system and associated food diverter and/or dislodgement station according to embodiments of the present invention.

FIGS. 1A–1C illustrate that the arm members 30a can reside within the recess 31 during processing in advance of the food diverter station 200. FIG. 3 illustrates that the processing system 400 that is located downstream of the food diverter station 200 can include one or more of an oven 401, a thermal holding zone 402, and/or a cooler 403. FIGS. 2A and 2B illustrate that the arm members 30a can be inserted at the food diverter station 200. In other embodiments, the arm members 30a can be inserted into the respective recesses 31, after the food processing system 400 (FIG. 3) but before the food diverter station 200 (not shown).

The trays 30t and/or arm members 30a may be formed of a food compatible material such as stainless steel and can include suitable anti-stick or lubricious coatings as desired.

It is also noted that, as shown in FIG. 1C, in certain embodiments, the food diverter station 200 can be operated to dislodge a first longitudinally aligned series of food $25_i$ onto a cooperating pathway or container and then serially dislodge a second longitudinally aligned series of food $25_{i+1}$. The carrier member 30c may be sized and configured to hold additional lines of food 25. In operation, the diverter station 200 can be configured to temporarily stall or halt the lateral movement of the arm(s) 30a across the width of the carrier member 30c intermediate the first and second dislodgments. The first series and second series $25_i$, $25_{i+1}$, respectively, can be dislodged so as to form a substantially linear continuous arrangement of food on the second pathway $30p_2$.

In certain embodiments, the food 25 can be diverted onto a laterally spaced apart moving pathway $30p_2$. FIG. 1C illustrates the holding receptacle or bin 250 as being held on an advancing pathway such as a conveyor or other suitable advancement means. In other embodiments, the food 25 can be removed from the carrier member 30c and deposited directly onto the second pathway $30p_2$. In other embodiments, the food holding receptacles 250 can be manually positioned in cooperating alignment with the carrier member 30c at the food diverter station 200 and removed as needed.

Turning again to FIGS. 1A–1C, the food diverter station 200 includes at least one (shown as a plurality of serially and/or concurrently activatable) food diverter 202 with an associated securing mechanism 201. The food diverter 202 can be automated and configured as an electric, pnueumatic, and/or hydraulic driven cartridge body that extends and retracts at desired timing intervals to cause the securing mechanism 202 to serially engage the arm members 30a in the respective carrier members 30c. FIGS. 2A–2B illustrate a similar embodiment, but the securing mechanism 202 holds the arm members 30a and together they move back and forth in concert to engage with carrier members 30c. The securing mechanism 202 is shown as a clamp that closes against opposing sides of an end portion of the arm member 30a to (detachably or semi-permanently) engage therewith. The securing mechanism 202 may be otherwise configured so as to be able to engage the arm member 30a and direct the arm member 30a to laterally translate across at least a portion of the width of the carrier member 30c. Examples of other securing means include, but are not limited to, magnetic components, tongue and groove engagement, frictional slide fittings, bayonet fittings, spring loaded fittings, and other suitable attachment mechanisms.

In certain embodiments, the arm member 30a may be longer than the width of the floor 30f of the carrier member 30c and can include at least one upwardly extending projection (shown as feature 30u in FIG. 10E) that extends above the surface level of the floor 30f so that, as the arm member 30a moves laterally in a substantially planar or horizontal orientation (not shown), the projection contacts the bottom surface of the food to dislodge it or move it laterally off of the carrier member 30c. Alternatively, in certain embodiments, as shown in FIG. 1C, the food diverter 201 rises thereby lifting the securing mechanism 202 that, in turn, raises the arm member 30a. This operation can be carried out while moving the arm member 30a a lateral distance across the carrier member 30c, with the arm member 30a stationary in the lateral direction (having primarily vertical directional components).

Figure 4:
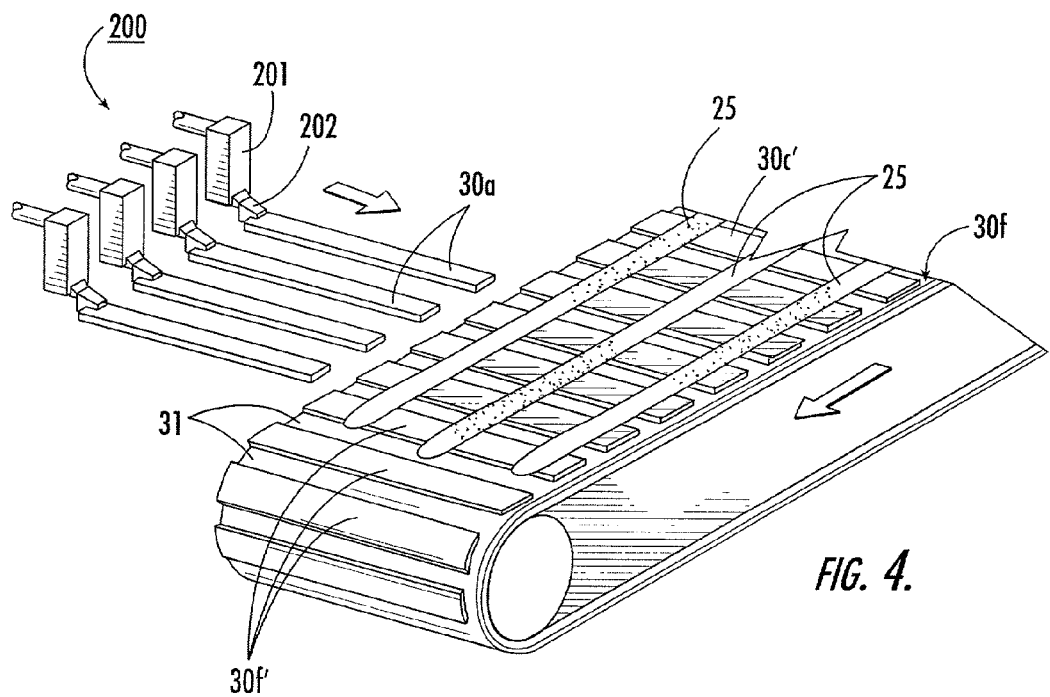
FIG. 4 is a front perspective view of a portion of a carrier member forming a portion of a travel path as well as an associated diverter station according to additional embodiments of the present invention.

FIG. 4 illustrates another embodiment where the carrier member 30c' is conveyor (shown as an endless conveyor). The floor 30f' of the conveyor 30c' is formed with a series of spaced apart primary flooring 30f that form the primary food contact and/or support surfaces with intermediately positioned recesses 31. As before, the arm members 30a may be configured to be inserted into the respective recesses 31 at the food diverter station 200 (or reside in the gaps of the recesses in advance of the diverter station). The conveyor floor 30f' may be formed of any suitable food compatible material, including, but not limited to, stainless steel, resin, elastomeric, ceramic, and the like.

Figure 5:
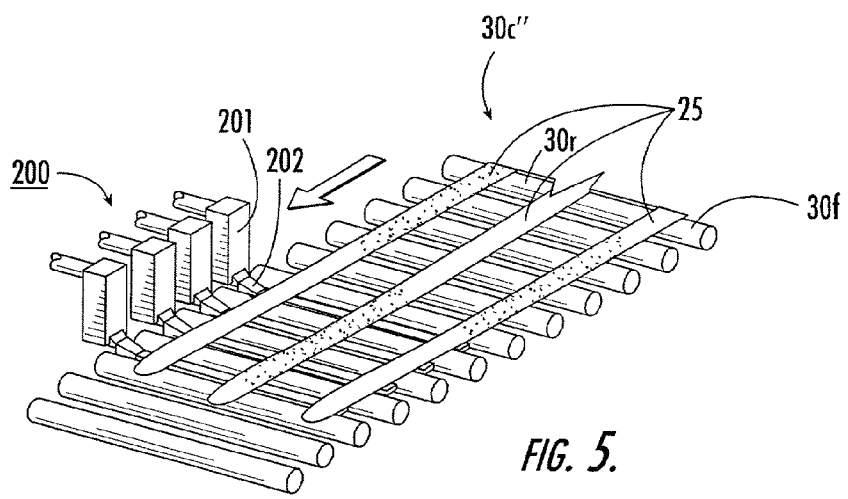
FIG. 5 is a front perspective view of a portion of yet another configuration of a carrier member forming a portion of a travel path according to other embodiments of the present invention.

FIG. 5 illustrates yet another embodiment, in which the carrier member 30c'' is defined by a plurality of spaced apart laterally extending rods 30r. The food 25 is shown as an elongated food product, but may be configured otherwise as noted above. The spacing of the adjacent rods 30r defines the recesses 31 that receive the arm members 30a. The rods 30r may be supported by side rails (not shown), underlying brackets (not shown) or other support means that allow the arm members 30a to enter a side portion of the recess 31 and extend the arm member 30a thereacross. As before, the arm member 30a may be held substantially horizontally as the arm member 30a is laterally translated across a portion or the entire distance of the width of the carrier member 30c'' or be inclined to rise above the floor 30f defined by the upper perimeter of the rods 30r.

Figure 6:
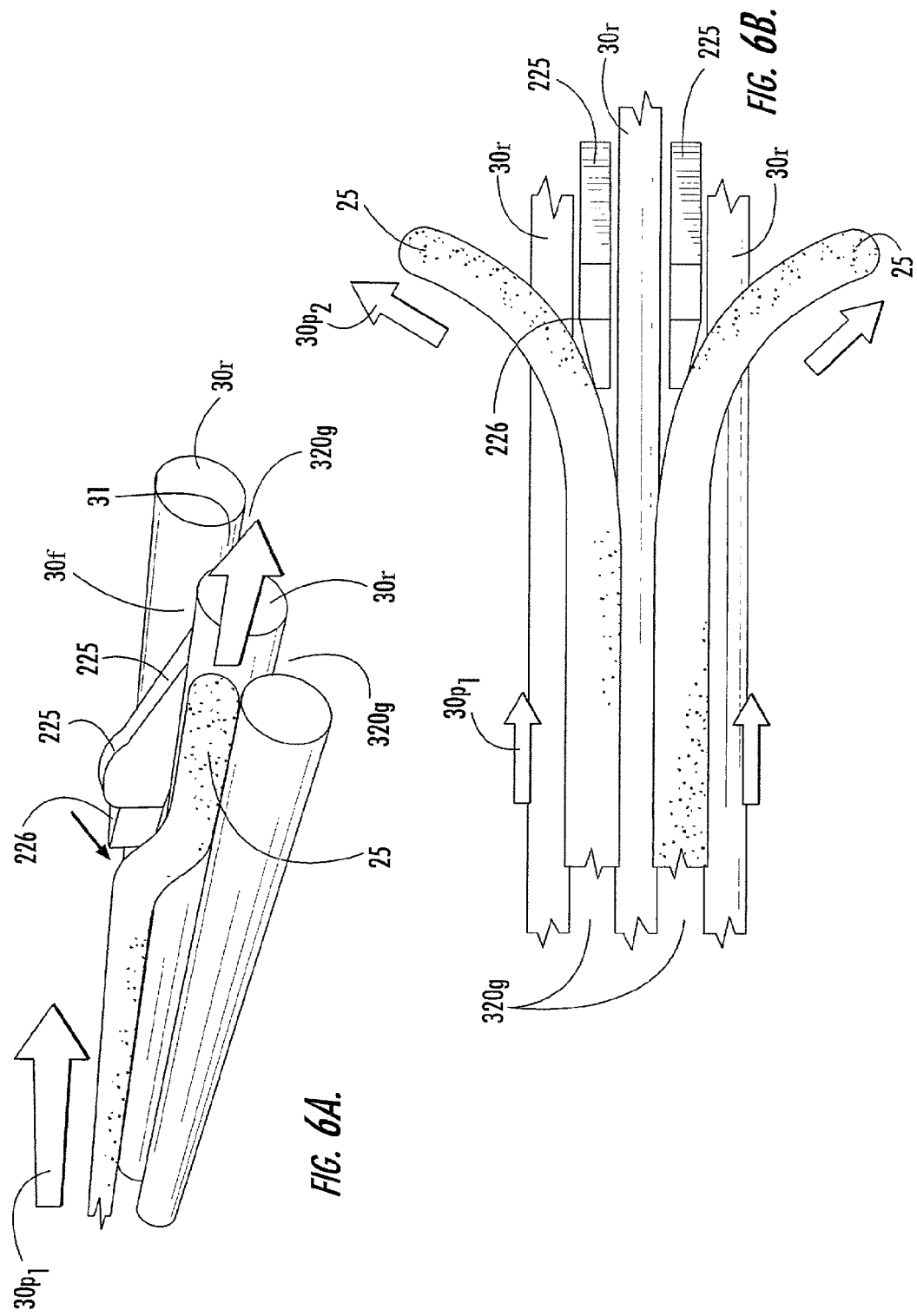
FIG. 6A is a side perspective view of a portion of a travel path having a laterally offset guide positioned within a recess therealong according to embodiments of the present invention.
FIG. 6B is a top view of a portion of a travel path that is configured to divert the food or other item to angularly travel away from the adjacent primary downstream direction of travel in a larger angular movement relative to that shown in FIG. 6A according to embodiments of the present invention.

FIGS. 6A and 6B illustrate an alternate food diverter device 225. In this embodiment, the food diverter device 225 is located in the primary direction of travel, held in a gap space 320g of the recess 31 defined by the food support flooring 30f. The gap space 320g is defined by the floor 30f, which, in the embodiment shown, is defined by two adjacent longitudinally extending rods 30r. In so doing, as a leading edge portion of the food 25 approaches on a first path corresponding to a first pair of rods 30r, it contacts the food diverter 225 and is forced laterally over to overlie the next adjacent pair.

The diverter device 225 can be held stationary in the position in the recess 31 at the desired vertical height. Alternatively, in operation, the diverter device 225 can be configured to be controllably retractable and extendable, (held either below or above the floor 30f) into the desired gap space 320g or recess 31 associated with the travel path 30$p_1$.

The food 25 can be advanced independently of, or with, the rods 30r. As such, the rods 30r may be configured to move or be held stationary, with the food moving forward over the rods 30r, to divert to an angularly and/or laterally offset travel path 30$p_2$ after contacting the forwardmost portion of the diverter 225.

As shown in FIG. 6B, the food 25 can be directed to depart from the first travel path 30$p_1$ at an angle that is about 30–90 degrees offset from the primary direction of travel on the first travel path 30$p_1$, automatically upon contact with the diverter device 225. FIG. 6B also illustrates that two separate lanes of food 25 can be concurrently diverted off the first travel path 30$p_1$ in opposing directions. The food 25 may be moving forward at a speed of about 3–7 fps, and typically between about 5–6.5 fps as it approaches the diverter device 225.

Figure 7:
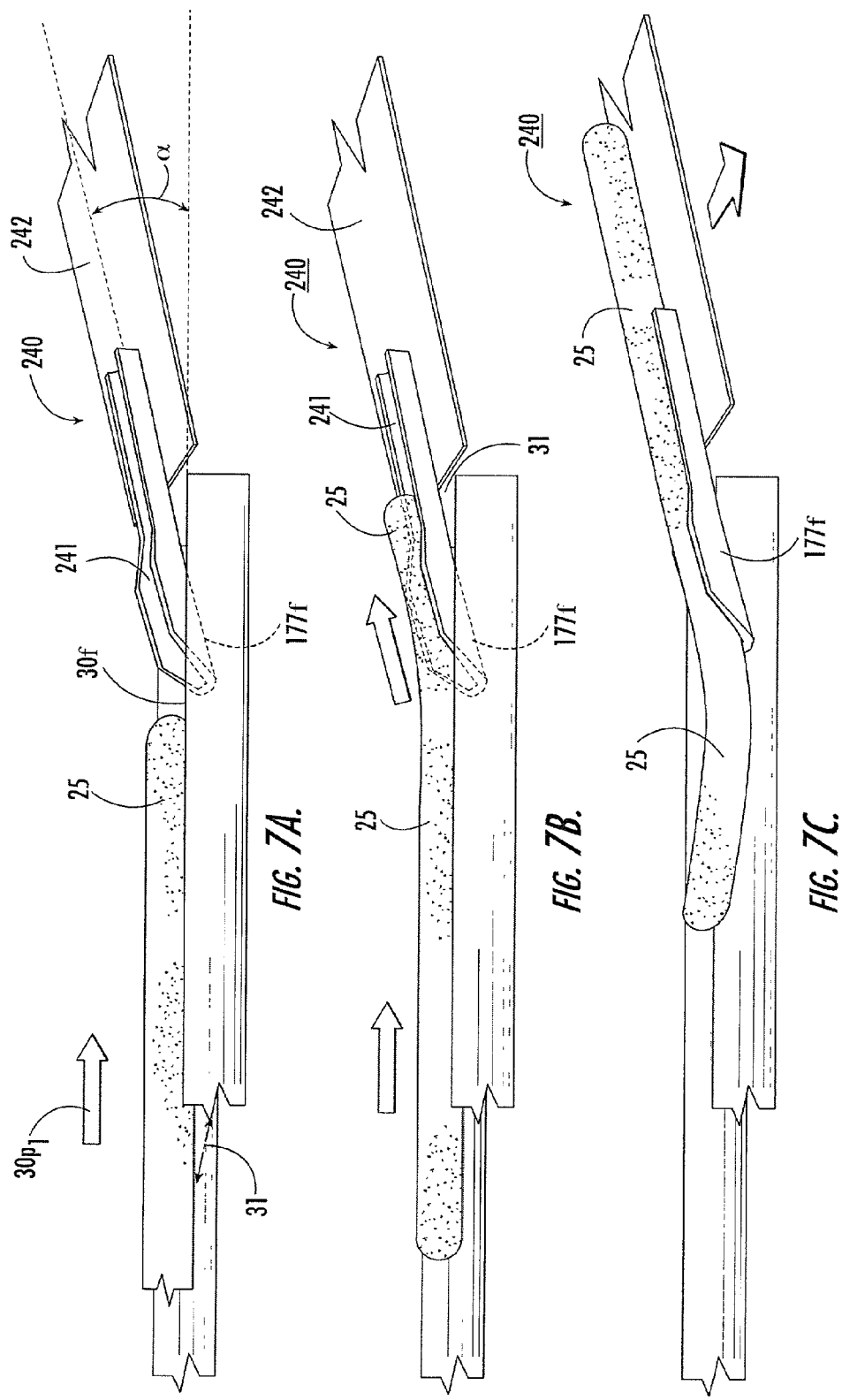
FIGS. 7A–7C are side views of a portion of a travel path illustrating a sequence of operations that can redirect the direction of travel according to yet other embodiments of the present invention.

FIGS. 7A–7C illustrate a sequence of operations to alter the travel direction of the food 25 according to certain embodiments of the present invention. As before, the food 25 is positioned to overlie a recess 31 provided by the food support floor 30f. The diverter device 240 can include a forward member 177f that is a first contact portion 241 that extends a distance into the well 31 to position it under the lowermost perimeter surface of the food 25. In operation, the diverter device 240 first engages the food and lifts, "picks up" or directs the food up (or down, if desired) and over a lateral distance as shown by the lateral arrow in FIG. 7C. The diverter device 240 can be pivotally arranged to turn, slide, swivel, or rotate laterally over a suitable distance after engaging a forward portion of the food 25 to position the food 25 at a desired location away from the first travel path. In other embodiments, the diverter device 240 may be configured to be stationary prior to receiving the food 25 to provide a pathway angularly disposed away from the first direction of the travel path 30$p_1$ immediately upstream thereof. In the latter, as for certain embodiments discussed above, the diverter device 240 can be configured to retract and extend into position.

FIG. 9A illustrates the floor 30f similar to that shown in FIG. 6A where that the food support floor 30f can include lanes 11 defined by pairs of spaced-apart elongated rods 300, 301 (as shown, these two rods 300, 301 define lane 11$_1$). Other embodiments can employ laterally spaced-apart cooperating rollers or other suitable structures (not shown). In any event, the spaced-apart rods, rollers, or other structures can define the recess 31 of the travel lane(s) 11. In operation, the food 25 resides above the gap space 320g (320g, FIGS. 14A, 14B). FIGS. 9A and 9B illustrate that the pairs of rods can be configured so that each lane 11$_1$, 11$_2$ has its own corresponding pair of rods 300, 301 and 302, 303, respectively (FIG. 9B), or so that adjacent travel lanes 11$_1$, 11$_2$ share one of the rods, 300, 301 and 301, 302. In operation, the rods 300 et seq. can be configured to advance in a desired rate of speed to form the moving floor 30f so as to advance the food 25 item along the travel path 100. In particular embodiments, two stainless steel rods 300, 301 define a travel floor or lane and the rods may have about a ⅝ inch outer diameter and be spaced apart a distance so that there is about 0.5–1 inch between centers. In certain embodiments, about a ⅝ inch cross-sectional area meat product nests therein such as shown in FIG. 9A. The spacing and size may vary depending on the product size and density and the like.

Figure 8:
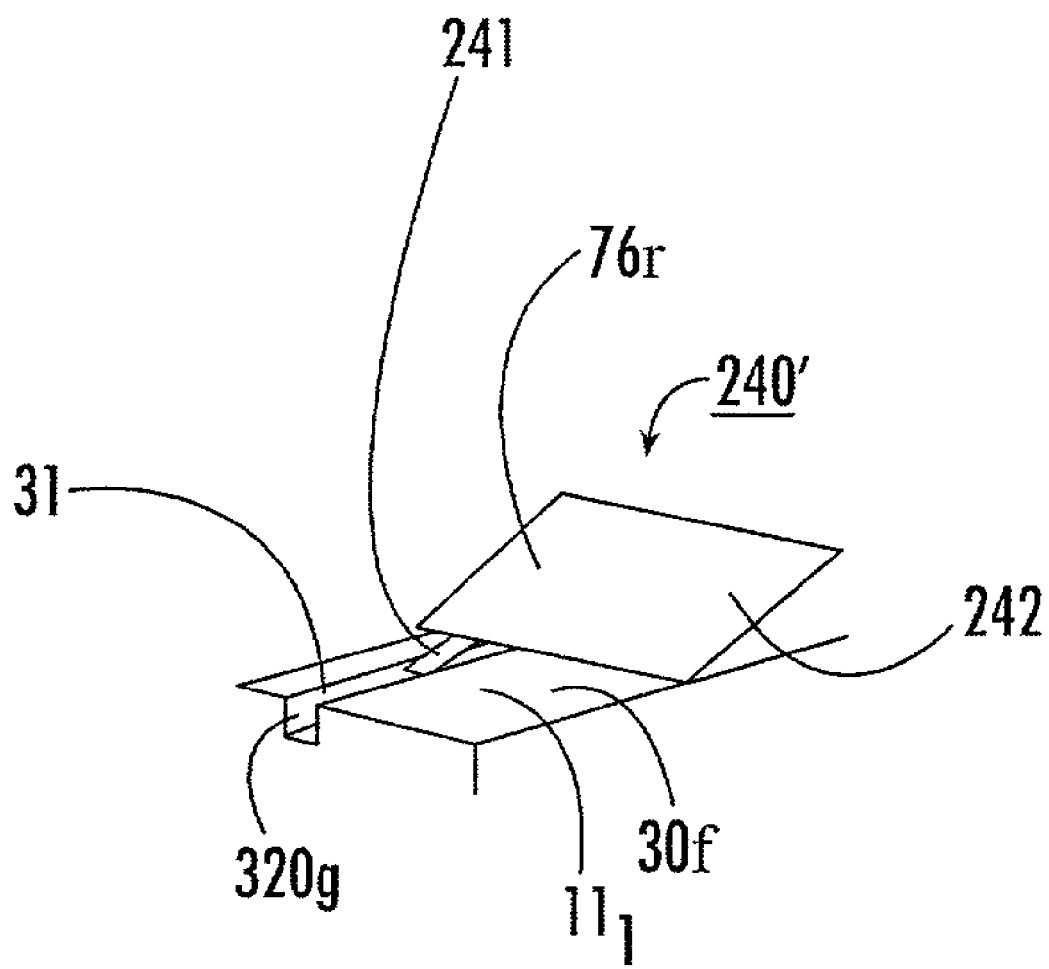
FIG. 8 is a side perspective view of a portion of a food travel path with a floor with a gap space underlying a portion of the width of the food product according to embodiments of the present invention.
Figure 12:
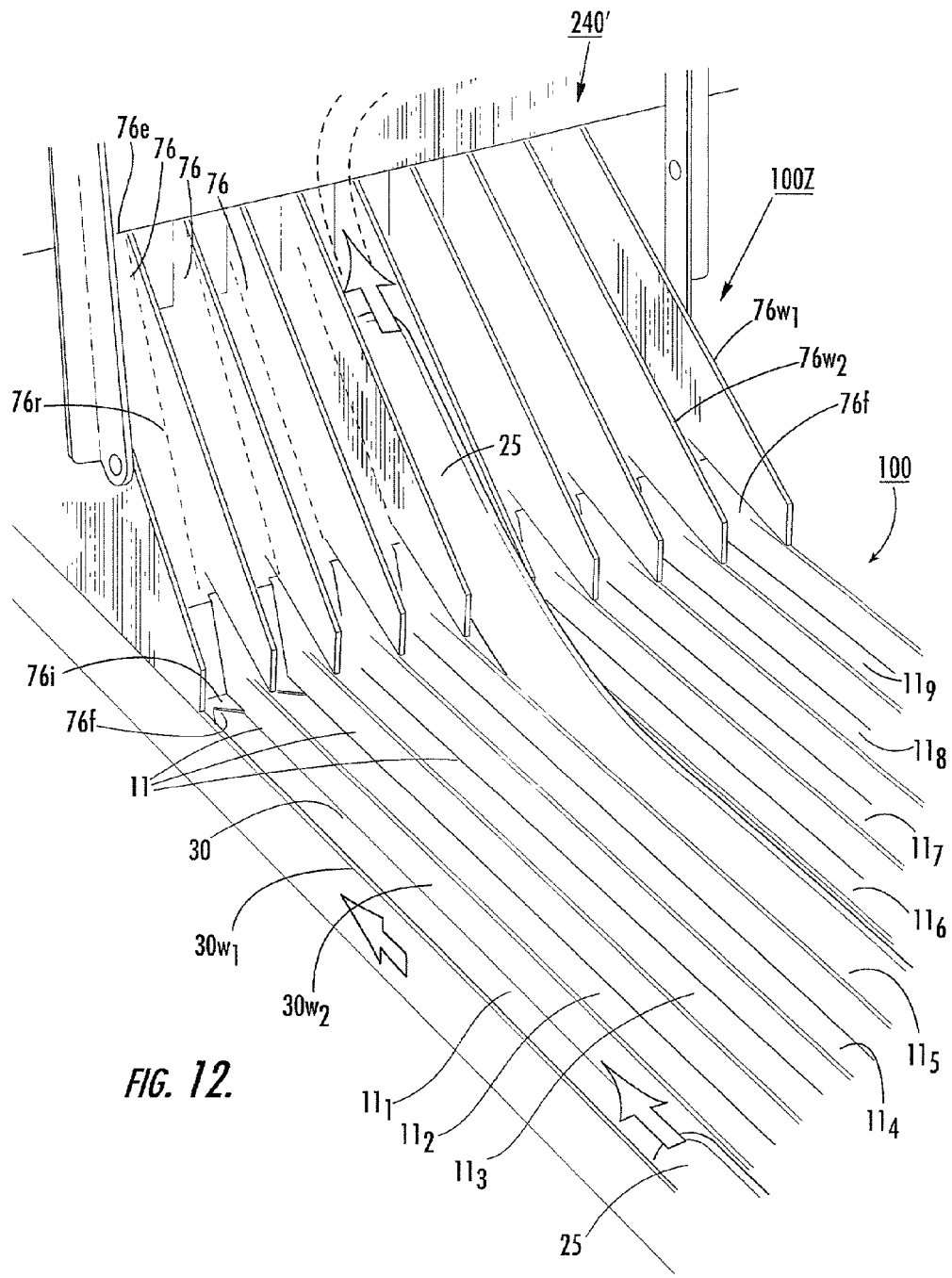
FIG. 12 is a perspective view of a pivotable assembly according to embodiments of the present invention.

FIG. 10A illustrates an alternate configuration of the floor 30f of a carrier member 30 (FIGS. 1A–1C), 30' (FIG. 4). As shown in FIG. 10A, the recess 31 can be configured to receive a lower portion of the food 25 therein. The floor 30f can be a moving floor 30f with a gap space 320g formed therein to define the recess 31. In this embodiment, the conveyor can be used to define one or more concurrently traveled side-by-side food travel lanes 11 (or a portion of same). As discussed for FIG. 4, the conveyor itself can be configured with a channeled floor surface 30f that provides the gap space 320g and recess 31. In any event, the gap spaces 320g or recesses 31 in the floor 30f can be arranged symmetrically or offset relative to adjacent floor surfaces (so as to be wider on a first side, and narrower on the opposing second side of the floor 30f) as shown in FIG. 8 in the lane 11 below the food 25. The gap space 320g or recess 31 is configured to open into or be in communication with the upper portion of the floor 320u upon which the food 25 rests. FIG. 8 also illustrates that the diverter mechanism 240 can include a tongue 76f that extends below the surface of the floor 30f (below the bottom perimeter of the food) a sufficient distance into the recess 31 and leads to a ramp portion 76r that rises a distance above the floor 30f. The tongue or receiving portion 76f of the diverter mechanism or device 240 may also be configured to be substantially flush with the lower perimeter portion of the food 25 (FIG. 12).

As shown in FIG. 10A, the upper portion of the floor 320u can have an aperture with a width $W_3$ that is larger than the width of the food $W_1$ and is sized and shaped to receive a portion of the food item therein so that the food 25 item resides above the gap space 320g. In so doing, the food item 25 can be supported by a reduced area physical contact portions $320c_1$, $320c_2$ on opposing side edge contact portions 320e of the floor 30f. At the contact locations $320c_1$, $320c_2$, the width of the aperture $W_4$ can be greater than about 50% of the width of the food item 25. In the embodiment shown in FIG. 10A, when viewed from the front, the floor aperture width narrows from top to bottom to hold the food item 25 suspended above the underlying gap space 320g. As such, the sidewalls 320w of the travel lane 11 can be configured to angularly extend between the top surface of the floor 320u and the top portion of the gap space 320g. In certain embodiments, the gap space 320g can be configured as a rectangular channel. Other shapes and sizes can also be used.

FIG. 10B illustrates an alternate configuration of a conveyor floor 30f having the gap space 320g formed directly under the upper portion of the floor 320u. The upper portion of the floor 320u may be a planar support surface. Ridges, valleys, or other axially extending lane guides may also be used (not shown). The width of the gap space 320g may be selected to correspond to the width of the food 25 as desired to form a sufficient support surface to inhibit deformation of the product as it travels on the conveyor. In certain embodiments, suitable gap widths may be widths that are between about 10–80% of the width of the product 25.

FIG. 10D illustrates yet another embodiment of a floor 30f similar to that shown in FIGS. 9A and 9B. As shown, the food 25 travels on a surface defined by two elongated spaced apart rods 30r, identified as 300, 301 and a centrally located smaller rod 302. The gag space 320g can be either one, or both, of the regions between the rods 300 and 302 or 302 and 301. FIG. 10C shows an additional embodiment where the food product 25 overlies a plurality of recesses 31 formed by closely spaced gap spaces 320g that the food product overlies. In operation, the arm member 30a (FIGS. 1A, 2, 4, 5) can enter into each or selected ones of the recesses to dislodge or divert the food 25. In operation, the diverter mechanism 200, 225, 240 (FIGS. 1A, 2A, 4, 5, 7) extends and enters one, all, or a plurality of the gap spaces 320g to cause the food to travel through the pick-up mechanism and/or to dislodge, pull, push, scoop, scrape, or otherwise manipulate the food 25 from the floor 30f.

FIG. 10E illustrates a floor 30f configuration with a recess 31 configured to receive the arm member 30a (FIGS. 1A, 2A, 4). In this embodiment, the arm member 30a includes at least one projection portion 30u that rises above the surface of the primary surface of the floor 30f.

The gap space 320g can have a width $W_1$ (FIG. 10B, 10E). In particular embodiments, the width $W_1$ may be selected so as to be greater than about 20–50% the width of the food item $W_2$ (FIG. 12) that travels thereon. In certain embodiments, the product may have a width of between about 0.5–5 inches, and the gap space 320g can be sized with a width that is between about 0.25–1 inches. The gap space 320g may have a depth of any suitable size. In certain embodiments, the depth is at least about 0.5 inches.

FIGS. 11A and 11B illustrate that the diverter device 240 shown in FIGS. 7A–7C can be configured with a forward member 177f that can be described as a downwardly extending protruding tongue or finger (instead of a scoop-like member). As shown, the forward member 177f is sized and configured to enter the gap space 320g of the recess 31. It may be centrally located with respect to the corresponding travel lane 11, or offset relative thereto, with a length that is sufficient to position a portion of the forward member 177f is positioned a distance into the gap space 320g. As shown in FIG. 11A, the forward member 177f is located proximate to and typically below the level of the food as the food 25 approaches the diverter device 240. In certain embodiments, the forward member 177f at a stationary vertical distance "D" into the gap space 320g, as shown, in position, the forward member 177f is proximate to, but resides below, the floor surface level (below or under the food). Of course the forward member 177f can be configured to extend downwardly greater distances into the gap space 320g as desired, such as below the level of the rods, where used. The angle of incline (or decline) of the forward member 177f can be selected so as to inhibit the disruption of the food as the food 25 transfers from the moving floor to travel over the forward member. Typically, the angle of incline will depend on the size and/or weight of the product, the speed of the moving floor 300f, 320f, and the like. The angle of incline for the forward member 177f and/or the ramp 76r can be any desired angle, typically under about 90 degrees. In certain embodiments the angle can be about 10–80 degrees, and in particular embodiments about 20–70 degrees. In some embodiments, the angle of both or one of the forward member 177f and/or the ramp portion 76r (FIG. 8) is about 45 degrees. As before, the floor of the forward member 177f or floor of the ramp portion 76r can be stationary (formed of a rod, plate, or other static structure) or may include conveyors, rollers, bearings, or other suitable flooring components.

In operation, as shown in FIGS. 11A and 11B, the food 25 can straddle or overlie the underlying gap space 320g and is then directed to contact and climb the forward member 177f. For automated continuous movement systems such an action can be carried out in a manner that inhibits the disruption of the continuous automated (forward) movement. As before, the forward member 177f and/or the floor of the diverter mechanism 240 may be stationary and the food propelled partially or wholly by its forward momentum. The forward member 177f may be configured from stainless steel or other desired material (coated or uncoated as noted above). This embodiment may reduce the friction or interference of the movement at the junction 100z of the floor 30f of the carrier member 30c, conveyor 30c', or rods 30r. Air may be optionally used at desired locations along the junction or transfer zone 100z to help direct the food.

In certain embodiments, the location in the travel path that carries out the directional change can be described as a transition zone 100z (FIGS. 11A, 11B). As shown in FIG. 12, looking at lane 115, as the food product 25 advances toward the transition zone 100z, it approaches the ingress portion 76i of the diverter device 240', then enters and climbs to exit at the egress portion 76e.

Still referring to FIG. 12, one embodiment of a portion of a travel path 100 in a food processing system 400 (FIG. 3) with a food product 25 and a transfer or changeover zone or region 100z (shown as a lateral translation region or zone) is shown. The arrows shown in FIG. 12 with respect to each of the food products 25 (one in lane $11_1$ and the other in lane $11_5$) indicate the direction of travel or food movement along a particular tier. The direction of travel can be reversed where desired and/or alternated between tiers in multi-tier systems. The pick-up mechanism 76' can be used to alter or transition the travel path for the food in a particular travel lane 11 to change from a first path to a higher, lower, longitudinally, or laterally offset second path.

In certain embodiments, the travel path 100 includes a plurality of side-by-side adjacent travel lanes 11. In the embodiment shown, there are nine side-by-side lanes 11: namely, from the left side to the right side, a first lane $11_1$, a second adjacent lane $11_2$, a third adjacent lane $11_3$, a fourth adjacent lane $11_4$, a fifth adjacent lane $11_5$, a sixth adjacent lane $11_7$, an eight adjacent lane $11_8$, and aninth adjacent lane $11_9$. In operation, in particular embodiments, the food product 25 can serially progressively travel over each or selected lanes. The food travels more than one revolution, and in so doing, passes a predetermined reference location associated with the tier a plurality of times. In certain embodiments, the food initiates travel from a predetermined lane (that may be the outer or inner lane) and moves across a number "n" of intermediately positioned lanes to an opposing lane. In the embodiment shown, the product 25 can start from either the inner lane $11_1$ or outer lane $11_9$. For multi-tier configurations with circular, oval, elliptical or other endless lane configuration, the system may be configured so that the food alters travel direction and/or lane progression so as to travel from a selected inner lane portion to a selected outer lane portion, then to a selected outer lane portion to a selected inner lane portion on adjacent or selected tiers, or vice versa. For additional description of multi-tier systems and/or the alternating lane travel progression, see U.S. patent application Ser. No. 09/888,925 to Shefet et al., incorporated by reference hereinabove.

In certain embodiments, a plurality of non-connected elongated products are processed concurrently and the products are forced to laterally translate a sufficient distance to cause the products to skip adjacent lanes and to subsequently travel over a respective lane that is laterally spaced over a predetermined number of lanes from its first travel lane. For example, if three separate products 25 are processed, the first may travel in lane $11_1$, the second in lane $11_2$, and the third in lane $11_3$. As they approach the transfer zone 100z, the first product in lane $11_1$ is laterally transferred over to lane $11_4$ (and then to $11_7$ if it travels another revolution over the tier), the second product to $11_5$ (and then to $11_8$ if it travels another revolution over the tier), and the third product travels or is diverted to lane $11_6$ (and then to $11_9$ if it travels another revolution over the tier).

In certain embodiments, the food 25 is held so that it is substantially centered over the recess 31 even when the food is moving at a rate of between about 1–20 feet per second, typically about 1–10 ft/sec, and more typically about 5 ft/sec, just before it enters or contacts the diverter guide 225, 240, 240' (FIGS. 6A, 6B, 7A, 11A, 12). Other speeds may be used depending on the application (dwell time, food configuration or size, food density, food frictional parameters, and the like). In other embodiments, such as that shown in FIGS. 1A, 2A, and 4, the food and its support floor 30f are stationary at the diverter station 200 and the diverter 200 can be configured to translate to engage with the food to dislodge, lift, scrape, pull, or push the food from the floor 30c.

In certain embodiments, the forward member 177f can include an angled or beveled edge portion 77b to help engage or scoop the food (gradually increasing in thickness along the travel direction) while minimally disrupting the forward movement thereof as the food approaches the transition zone 100z. The forward member 177f can be angled at an angle corresponding to the angle of the ramp of the diverter device 240, 240' (FIGS. 7A, 11B, 12).

As shown in FIG. 12, the food is directed to angularly depart from a first travel lane 11 to a second different angularly offset travel lane and direction. Thus, the angle of offset defined by the diverter device 240, 240' between the upstream to downstream portion of the travel path can vary depending on one or more of the amount of lateral translation desired, the length over which it occurs, the type or size of product being processed, and/or the speed at which the translation between lanes occurs. Thus, in operation, the food diverter device 240, 240' can be configured to simultaneously or concurrently automatically divert the food in each predetermined travel lane to the next desired lane at the same place in the travel path. The travel lanes 11 may be linear, curvilinear, circular, or other desired shape. Of course, other numbers of lanes 11 (larger or smaller numbers) can be used and different numbers of lanes can be used on different tiers or levels. The lanes do not necessarily need to abut and can be spaced apart as desired.

In certain embodiments, the series of operations to process the food can include advancing at least one food item on a carrier surface in a food processing system. The carrier surface or floor includes a plurality of recesses configured with two opposing side edge portions separated by a gap space having an associated width and depth. In certain embodiments, the gap space width can be greater than about 20–50% (or a major portion) of the width of the food item. In position, the food item spans the gap space and rests against the two opposing side edge portions above the underlying gap space. The food item can be an elongated meat product in a casing, a casingless product, a planar substantially dehydrated meat product, and/or other desired product.

In summary, food 25 is directed to travel over a floor that engages with a diverter mechanism 200, 225, 240, 240. The mechanism may be configured to repetitively retract and enter and/or move over a length of the recesses 31. In other embodiments, the mechanism can be configured to define a portion of the travel path that is in the stream of travel such as intermediate two moving floor portions.

The food item can be directed to travel greater than one revolution, traveling over at least two adjacent lanes on a selected tier, before moving to the next tier. See co-pending U.S. Patent Application Ser. No. 10/170,887 identified by, corresponding to U.S. Provisional Application Ser. No. 60/354,097, filed Feb. 4, 2002, the contents of which are incorporated by reference as if recited in full herein.

In certain embodiments, a plurality of end-to-end cooperating conveyors or an endless conveyor are used to form the travel path through the processing system 400 (FIG. 3). The moving floor portions may be set to move at the same or dissimilar speeds as desired.

In particular embodiments, the predefined side by side travel lanes 11 (FIG. 12) can be configured or formed using one conveyor having a sufficient width to provide the number of lanes, or by using at least two (two or more) side-by-side cooperating conveyors. The conveyors "cooperate" in that they are configured to be in communication and operate together to either present or receive food from the other conveyor so that the food serially (directly or indirectly) travels first on one then on the other. The cooperating conveyors can be configured as side-by-side and/or in-line conveyor arrangements. Of course other combinations of conveyors (such as side-by-side alone, in-line alone, or other quantities or shapes of conveyors arranged to define the travel path and/or lanes) can also be used. Additionally, two or more sets of cooperating conveyors can be used to concurrently process different food items (or strands or sets of items) about the same tier (not shown). See U.S. patent application Ser. No. 09/888,925 to Shefet et al. for additional description of conveyor configurations, the contents of which are hereby incorporated by reference as if recited in full herein.

The speed of the conveyor(s) used to form one or more of the moving floors can be set to match the desired residence time according to the time desired in each processing region.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for routing, dislodging or guiding food in a food processing system, comprising:
   automatically advancing at least one food item on a carrier surface in a carrier surface direction of travel, the carrier surface having a plurality of laterally extending recesses with associated lengths, widths, and depths formed therein, the at least one food item positioned so that it overlies a portion of at least one of the plurality of laterally extending recesses;
   inserting a laterally extending arm member into at least one of the recesses under the at least one food item; and
   moving the arm member across the recess so that the arm member travels in a predetermined direction having horizontal and/or vertical directional components relative to the laterally extending recess to contact and dislodge the at least one food item.

2. A method according to claim 1, wherein the food item is adhered to the carrier surface during the advancing step.

3. A method according to claim 1, wherein the moving step is carried out so that the arm member moves substantially orthogonally to the carrier surface travel direction, the method further comprising capturing the at least one food item in a container located on a side that is opposite a first side portion of the recess.

4. A method according to claim 1, wherein the at least one food item is a plurality of discrete pieces of meat product, each positioned so that it overlies at least a portion of the length of at least one of the recesses in the carrier surface, and wherein at least some of the plurality of meat products extend side by side across the same recess.

5. A method according to claim 1, further comprising heating the at least one food item during the advancing step before the moving step so that the food item is adhered to the carrier surface.

6. A method according to claim 4, wherein the steps of moving is automatically repeated at desired intervals to automatically serially dislodge a plurality of different portions of meat product such that the arm extends across at least a major portion of the width of the carrier surface of the product.

7. A method according to claim 1, wherein the step of inserting is carried out by retracting and extending a retractable food diverter so that it extends to engage a first portion of the carrier surface, then retracts away from the carrier surface, and then subsequently engages a second portion of the carrier surface that is rearwardly positioned relative to the first portion.

8. A method according to claim 1, wherein the carrier surface endlessly travels along a predetermined portion of the food travel path.

9. A method according to claim 8, wherein the carrier surface is defined by the floor of an endless conveyor.

10. A method according to claim 1, wherein the advancing step comprises advancing a plurality of serially spaced apart trays, each defining a respective portion of the carrier surface.

11. A method according to claim 1, wherein the carrier surface is a plurality of laterally spaced apart rods, the gap distance between the laterally spaced rods defining the laterally extending recesses.

12. A method according to claim 1, wherein the moving food item is an elongated meat product.

13. A method according to claim 1, wherein a plurality of arm members simultaneously engage a plurality of recesses to concurrently dislodge a plurality of food items.

14. A method according to claim 1, wherein the arm member comprises an upwardly extending projection that resides above the level of the carrier surface when inserted into the recess.

15. A method of routing, guiding or dislodging food, comprising:
   advancing a plurality of spaced apart food items on a carrier surface having a plurality of laterally extending recesses extending across at least a major portion of a width of the carrier surface, the recesses configured to accept at least one laterally extending plank, the laterally extending plank having opposing first and second end portions, wherein the food items are placed on the carrier surface to overlie a portion of at least one of the plurality of laterally extending recesses; and
   lifting the first end portion of one or more the planks above the carrier surface so that the lifted planks downwardly incline from the first end portion to the second end portion to dislodge food items and cause the food items to fall into a receiving member adjacent the carrier surface on the second side portion of the planks.

16. A method according to claim 15, wherein at least some of the food items are adhered to the carrier surface during the advancing step.

17. A method according to claim 15, wherein the advancing step has a carrier surface primary travel direction, the method further comprising inserting the laterally extending planks into at least some of the recesses so that the planks are inserted substantially orthogonally to the carrier surface travel direction.

18. A method according to claim 15, wherein the plurality of food items are discrete pieces of meat product, each positioned so that it overlies at least a portion of the length of at least one of the recesses in the carrier surface, and wherein at least some of the plurality of meat products extend side by side across the same recess.

19. A method according to claim 17, further comprising heating the food items during the advancing step before the inserting step so that at least some of the food items are adhered to the carrier surface.

20. A method according to claim 17, wherein the step of inserting is automatically repeated at desired intervals to automatically serially dislodge a plurality of different portions of meat product.

21. A method according to claim 17, wherein the step of inserting is carried out by retracting and extending the planks so that the planks engage a first portion of the carrier surface, then retract away from the carrier surface, then subsequently engage a second portion of the carrier surface that is rearwardly positioned relative to the first portion.

22. A method according to claim 15, wherein the carrier surface endlessly travels along a predetermined travel path.

23. A method according to claim 22, wherein the carrier surface is defined by the floor of an endless conveyor.

24. A method according to claim 15, wherein the advancing step comprises advancing a plurality of serially spaced apart trays, each defining a respective portion of the carrier surface.

25. A method according to claim 15, wherein the planks comprise an upwardly extending projection that reside above the level of the carrier surface when inserted into the recess.

26. A method of routing, guiding or dislodging food, comprising:
   advancing a plurality of spaced apart food items on a carrier surface having a plurality of laterally extending recesses with associated lengths, widths, and depths formed therein, the food items placed to overlie a portion of at least one of the plurality of laterally extending recesses;
   inserting at least one laterally extending plank into at least one of the recesses, the planks having opposing first and second end portions; and
   pushing the at least one plank from a first side of the carrier surface across at least a major portion of a respective recess to dislodge food items and direct the food items into a receiving member adjacent the carrier surface on the second side of the planks.

27. A method according to claim 26, wherein a generally all of the recesses proximate food items have at least one corresponding plank residing therein as the carrier surface travels in a primary travel direction.

28. A method according to claim 26, wherein a plurality of planks are concurrently inserted at a desired dislodging location in a food travel path.

29. A method according to claim 26, wherein at least some of the food items are adhered to the carrier surface during the advancing step and before the inserting step.

30. A method according to claim 26, wherein at least some of the food items are adhered to the carrier surface during the advancing step and after the inserting step.

31. A method according to claim 26, wherein the inserting step is carried out so that the planks move substantially orthogonally to a carrier surface travel direction, the method further comprising capturing the food items on a receiving member located on a side that is opposite a first side portion of the recess.

32. A method according to claim 26, wherein the plurality of food items are discrete pieces of meat product, each positioned to overlie at least a portion of at least one of the recesses in the carrier surface, and wherein at least some of the plurality of meat products extend side by side across the same recess.

33. A method according to claim 26, further comprising heating the food items during the advancing step before the inserting step so that at least some of the food items are adhered to the carrier surface.

34. A method according to claim 26, further comprising heating the food items during the advancing step after the inserting step and before the pushing step so that at least some of the food items are adhered to the carrier surface.

35. A method according to claim 26, wherein the step of inserting is automatically repeated at desired intervals to automatically serially dislodge a plurality of different portions of meat product.

36. A method according to claim 26, wherein the step of pushing is automatically repeated at desired intervals to automatically serially dislodge a plurality of different portions of meat product.

37. A method according to claim 26, wherein the steps of inserting and pushing are carried out by retracting and extending the planks so that the planks engage a first portion of the carrier surface, then retract away from the carrier surface, then subsequently engage a second portion of the carrier surface that is rearwardly positioned relative to the first portion.

38. A method according to claim 26, wherein the carrier surface endlessly travels along a predetermined travel path.

39. A method according to claim 26, wherein the advancing step comprises advancing a plurality of serially spaced apart trays, each defining a respective portion of the carrier surface.

40. A method according to claim 26, wherein the planks comprise an upwardly extending projection that resides above the level of the carrier surface when inserted into a respective recess.

* * * * *